United States Patent [19]

Sugiyama

[11] Patent Number: 5,108,480
[45] Date of Patent: Apr. 28, 1992

[54] BEND-SHAPING PRESS MOLD, METHOD OF BEND-SHAPING A GLASS PLATE AND APPARATUS FOR BEND-SHAPING A GLASS PLATE

[75] Inventor: Tatsuo Sugiyama, Yokohama, Japan

[73] Assignee: Asahi Glass Company Ltd., Tokyo, Japan

[21] Appl. No.: 597,874

[22] Filed: Oct. 12, 1990

[30] Foreign Application Priority Data

Oct. 17, 1989 [JP] Japan .................. 1-268253

[51] Int. Cl.⁵ ............................. C03B 23/03
[52] U.S. Cl. ........................... 65/106; 65/107; 65/273; 65/287
[58] Field of Search ............ 65/106, 107, 273, 287

[56] References Cited

U.S. PATENT DOCUMENTS

| | | | |
|---|---|---|---|
| 4,272,275 | 6/1981 | Reese | 65/273 |
| 4,746,348 | 5/1988 | Frank | 65/106 |
| 4,778,507 | 10/1988 | Aruga et al. | 65/106 |
| 4,828,598 | 5/1989 | Imamura et al. | 65/106 |
| 4,909,820 | 3/1990 | Hirotsu et al. | 65/106 |

FOREIGN PATENT DOCUMENTS 0183418 6/1986 European Pat. Off. .

Primary Examiner—Joye L. Woodard
Attorney, Agent, or Firm—Oblon, Spivak, McClelland, Maier & Neustadt

[57] ABSTRACT

A bend-shaping press mold comprising a pair of pressing dies for bending a glass plate into a shape having a convex surface and a concave surface in a plane by pressing the glass plate with the pair of pressing dies, wherein each of the pressing dies has a convex surface portion to shape the glass plate by pressing it from each side which is finally shaped to have a concave surface portion, and the convex surface portion of one of the pressing dies is not substantially in contact with the glass plate in pressing operations when the convex surface portion of the other die is in contact with the glass plate.

5 Claims, 5 Drawing Sheets

BEND-SHAPING PRESS MOLD, METHOD OF BEND-SHAPING A GLASS PLATE AND APPARATUS FOR BEND-SHAPING A GLASS PLATE

BACKGROUND OF THE INVENTION

1. Field of the Invention

The present invention relates to a bend-shaping press mold used for bend-shaping a glass plate to have a convex surface and a concave surface on each side in a heating furnace, a method of bend-shaping a glass plate into a shape having a curved surface as described above, and an apparatus used for carrying out the above-mentioned method.

2. Technical Considerations

Various kinds of curved glass plates are used as elements for transportation means such as automobiles, trains, ships, aircrafts, buildings and so on. Various methods of bending glass plates have been used. As a typical method, a glass plate is cut to have a predetermined dimensions; the glass plate is heated to a glass softening temperature or a temperature close to it, and the glass plate is bent by using a press-forming method, a deadweight forming method or an air-forming method.

Recently, as a large variety of designs are employed for automobiles, there is a demand for windshield glass plates for automobiles such that, for instance, when a glass plate is attached to an automobile, the glass plate has a single arc in the horizontal direction, but in the vertical direction, the major portion of the glass plate is bent in one direction, the remainder being bent in the opposite direction, namely, the glass plate has at least a portion having an S-letter in cross section. In other words, the glass plate has a portion of inflection. It has been proposed to bend a glass plate by using a deadweight bending mold. Generally, a laminated glass wherein two glass plates are laminated and bonded to each other is used for a windshield glass in an automobile. When such a laminated glass is to be prepared, a step of simultaneously bend-shaping two glass plates is needed. The bend-shaping operation for the laminated glass is generally conducted by using a deadweight bend-shaping mold. However, it is difficult to bend-shape glass plates having a convex surface and a concave surface on each side because a portion having a small radius of curvature can not completely follow the shape of the deadweight bending mold.

Therefore, the bending operation to a glass plate having a convex surface and a concave surface at a plane is conducted as follows. A pair of bend shaping press dies having shaping surfaces which are complementary to each other are prepared. A glass plate is heated to a temperature near the softening point of glass; the glass plate is put between the pressing dies after it has been provisionally bent by its own deadweight, if necessary, and the glass plate is press-molded.

In the bend-shaping press mold used for carrying out the above-mentioned method, it is difficult to form the pressing dies having the shaping surfaces with sufficient accuracy so that the pair of pressing dies are simultaneously urged to the glass plate, and there results disagreement in shape of the pair of pressing dies, whereby a part of the glass plates is strongly pressed in pressing operations. A pressing force to a part of the glass plate causes a stress in it. In order to avoid the occurrence of a stress, it is necessary to increase accuracy of the shaping surface of the mold. However, such requirement increases cost for preparing the mold and it is technically difficult to manufacture the mold with high accuracy. Even though a mold having highly accurate shaping surface can be prepared, it is necessary to set a pair of dies at correct positions as well as the positioning of the glass plate, and much labor is required for the positioning.

SUMMARY OF THE INVENTION

It is an object of the present invention to provide a bend-shaping press mold, a method of bend-shaping a glass plate and an apparatus used for carrying out the method which do not require precise dimensions and positioning operations for pressing dies and a glass plate.

In accordance with the present invention, there is provided a bend-shaping press mold comprising a pair of pressing dies for bending a glass plate into a shape having a convex surface and a concave surface on each side by pressing the glass plate with the pair of pressing dies, wherein each of the pressing dies has a shaping surface comprising convex surface portion to shape the glass plate by pressing the glass plate to finally shape it to have a concave surface portion, and the convex surface portion of one of the pressing dies is not substantially in contact with the glass plate in pressing operations when the convex surface portion of the other die is in contact with the glass plate.

In accordance with the present invention, there is provided a method of bend-shaping a glass plate which comprises, placing a glass plate on a deadweight bending mold having a shaping surface, heating the glass plate to a temperature capable of bending glass in a heating furnace to thereby bend it by its deadweight so as to substantially meet the shaping surface of the bending mold, and pressing and bending the glass plate with a bend-shaping press mold as described above.

In the present invention, a bend-shaping press mold for pressing a glass plate, between a pair of pressing dies, into a shape having a portion of inflection is used wherein each of the pressing dies has a shaping surface comprising a convex surface portion for pressing the glass plate on a side which is finally shaped to have a concave surface portion, and the pressing surface of one of the pressing dies is not substantially in contact with the glass plate in pressing operation when the pressing surface of the other die is in contact with the glass plate, while the glass plate held between the pair of pressing dies is heated. Accordingly, one surface of the glass plate is not substantially in contact with the pressing surface of one of the pressing dies even when accuracy in the pressing surface of the dies is insufficient, whereby an undesirable local stress is not produced in the glass plate and occurrence of a local deformation and an optical distortion are avoidable.

DESCRIPTION OF THE PREFERRED EMBODIMENT

Preferred embodiments of the present invention will be described with reference to the drawings.

Figure 1:
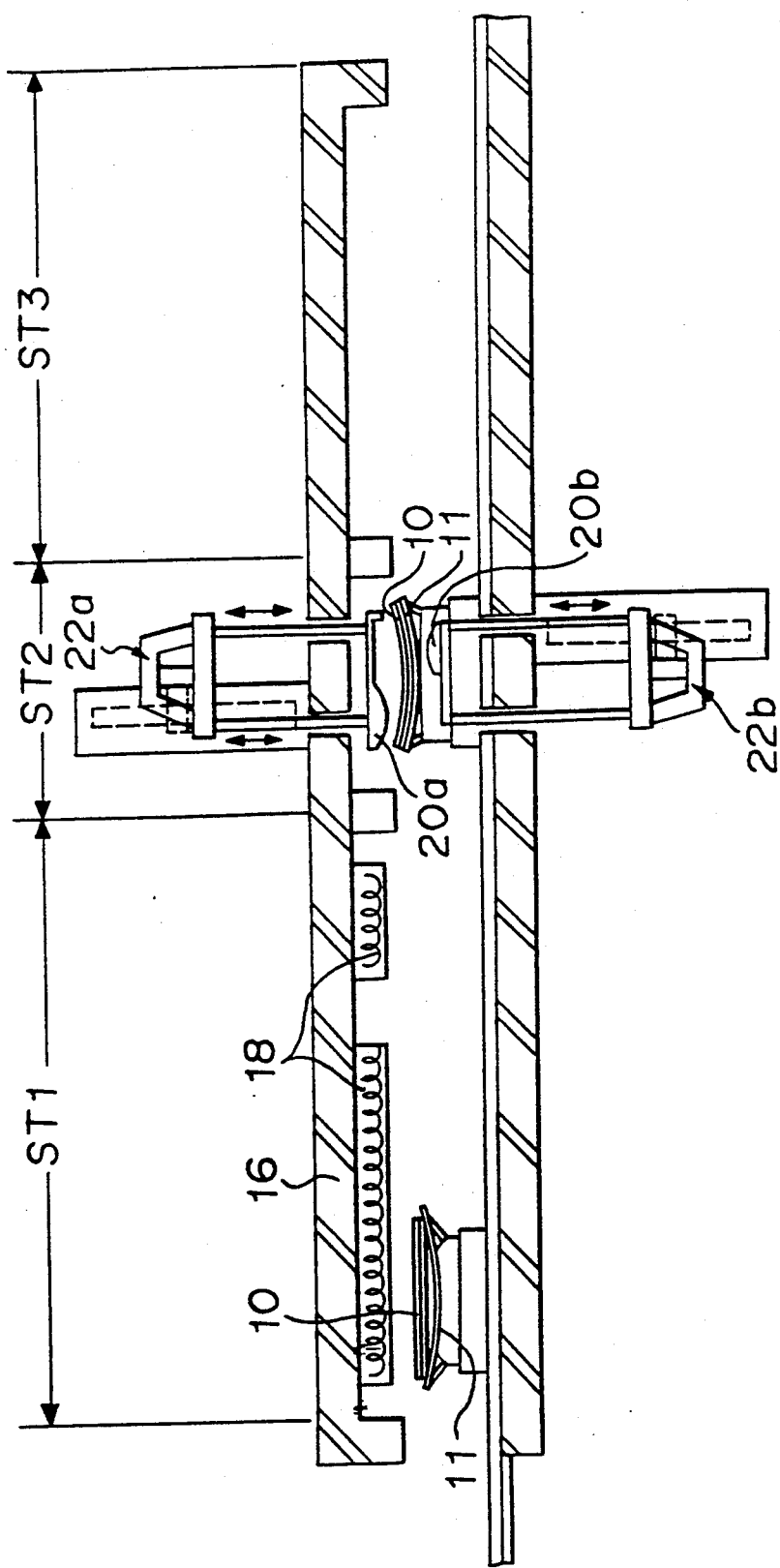
FIG. 1 is a diagram of an embodiment of the method of bend-shaping a glass plate according to the present invention.

FIG. 1 is a diagram showing an embodiment of the method of bend-shaping simultaneously two overlapping glass plates 10 into a shape having a concave surface and a convex surface on each side.

Figure 2:
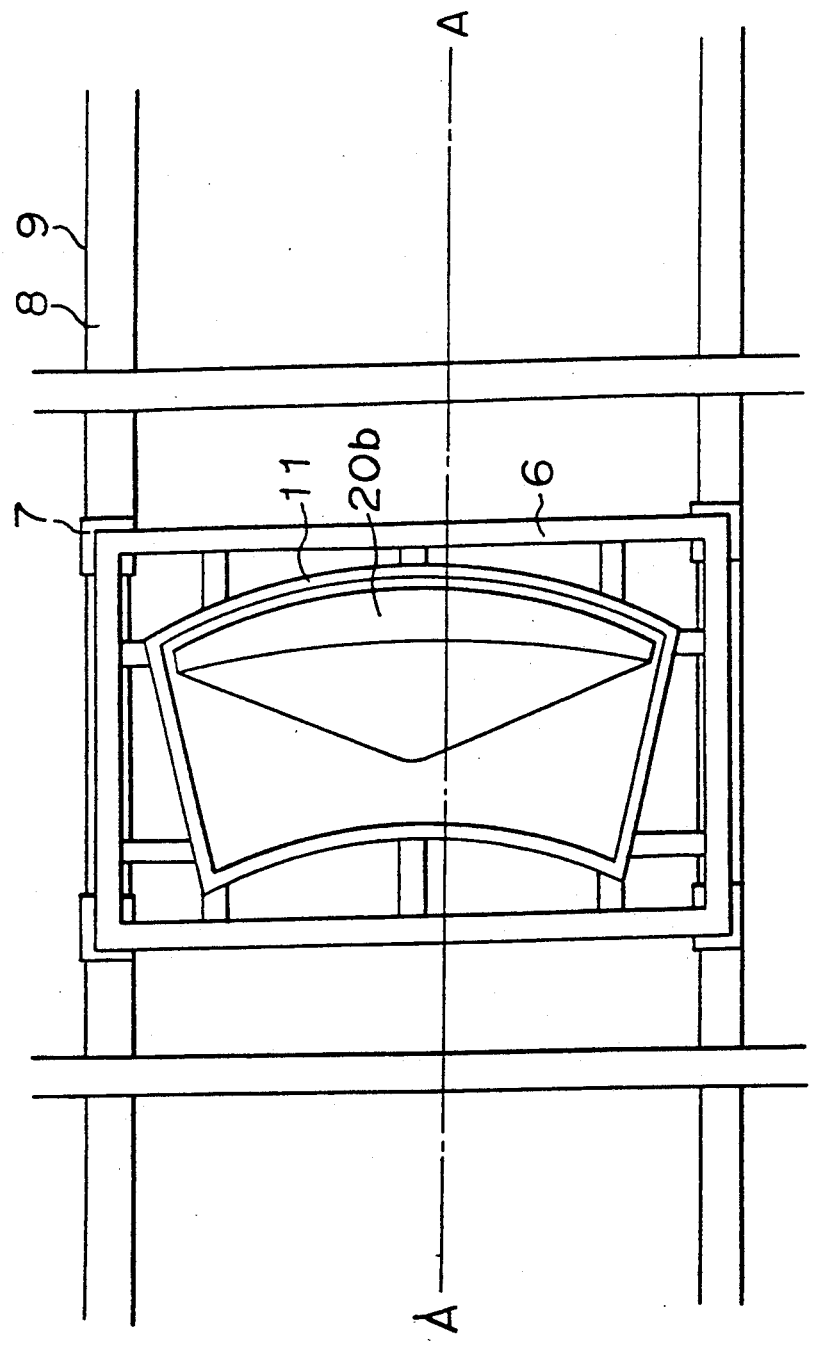
FIG. 2 is a plane view showing a state that a deadweight bending mold is in a pressing stage ST2, wherein the state is viewed from the upper part of a lower pressing die.

The glass plates 10 are put on a deadweight bending mold 11 in an overlapping state. The deadweight bending mold 11 is fixed to a chain 8 through a supporting frame 6 and a metal fitting 7 as shown in FIG. 2. The deadweight bending mold 11 is moved by moving the chain 8 along rails 9 as a means of conveying the deadweight bending mold 11 through the heating furnace 16. The deadweight bending mold 11 is successively passed to a heating/bend-shaping stage ST1, a pressing stage ST2 and a cooling stage ST3 in a heating furnace 16. FIG. 2 is a plane view showing the deadweight bending mold in the pressing stage ST2, which is viewed from the upper part of the lower pressing die.

In the heating/bend-shaping stage ST1, the overlapping glass plates 10 are heated to a working temperature (550° C. -650° C.) by heaters 18 in the heating furnace 16 so that they are provisionally shaped so as to meet the shaping surface of the deadweight shaping mold 11. The deadweight bending mold 11 is moved to the pressing stage ST2 and the position of the glass plates is determined. Then, the glass plates are put between a pair of pressing dies 20a, 20b and are pressed so that the glass plates 10 have a portion of inflection. Then, the glass plates are moved to the cooling stage ST3 where the press-shaped glass plates 10 are cooled on the deadweight bending mold 11 for a predetermined time, and thereafter, the glass plates 10 are discharged from the cooling section ST3 for cooling.

The deadweight bending mold 11 shown in FIG. 1 is of an integral type. However, a splittable type deadweight bending mold comprising a fixed splittable mold portion and movable splittable mold portions placed at both sides of the fixed splittable mold may be used. Further, the deadweight bending mold 11 may have a shaping surface resembling a shape of glass plates to be finally shaped. Further, the mold may have a shaping surface which corresponds to at least a part of a laminated glass plate, the mold being made of a material durable to a working temperature (580° C.-700° C.) in the heating furnace. When the splittable deadweight bending mold is to be used, a clamping means capable of fixing the movable splittable mold portions to the fixed splittable mold portion is preferably provided so as to prevent the movable splittable mold portions from jumping in pressing operations. Further, it is preferable that the glass plates are press-shaped after they have been transferred from the splittable type bending mold to an integral type bending mold.

Figure 3:
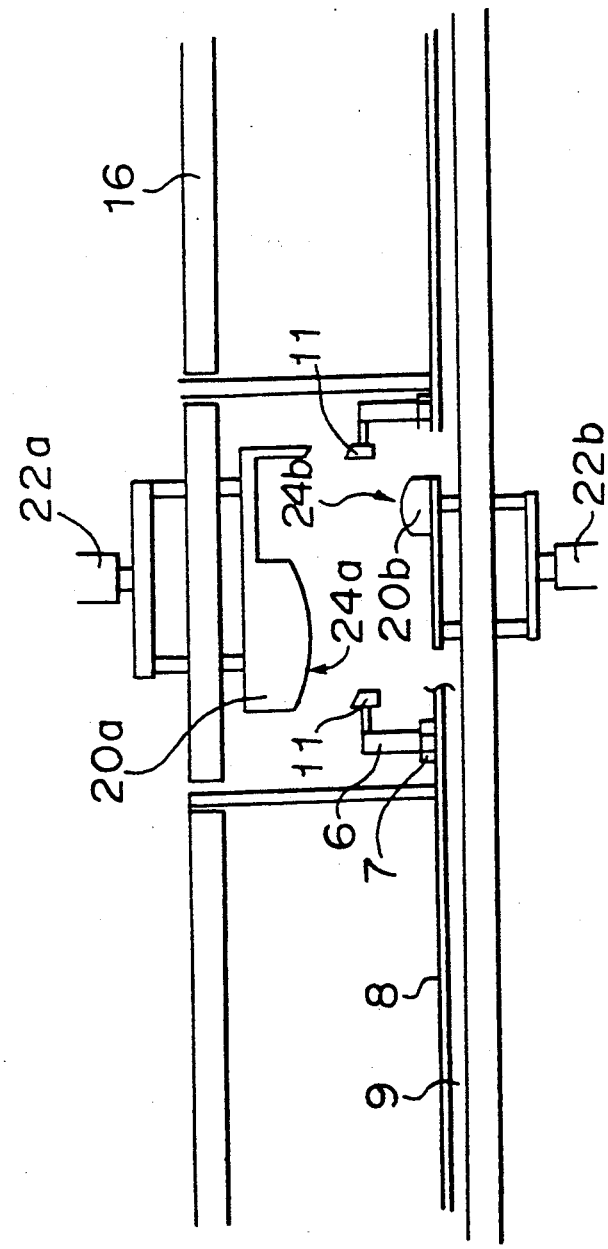
FIG. 3 is a diagram showing the bend-shaping mold of the present invention in the pressing stage ST2.

FIG. 3 is a diagram showing the deadweight bending mold 11 in the pressing stage ST2. FIG. 3 is a crosssectional view taken along a line A—A in FIG. 2. In FIG. 3, a reference numeral 20a designates an upper pressing die having a convex surface portion 24a and a numeral 20b designates a lower pressing die having a convex surface portion 24b. The upper and lower pressing dies 20a, 20b are respectively connected to cylinders for 22a, 22b as driving means so that the pressing dies 20a, 20b are movable in the vertical direction in correspondence to the elongation and shrinkage of the cylinders to thereby perform the press-shaping of glass plates.

As shown in FIGS. 1 and 3, the pair of pressing dies respectively have a shaping surface comprising a convex surface portion for shaping overlapping glass plates by contacting and pressing it from both sides of the glass plates to be finally shaped into a concave surface, wherein when the convex surface portion of the first pressing die is in contact with the glass plates in pressing operations, the surface portion of the second pressing die which corresponds to the convex surface portion of the first pressing die is not substantially in contact with the glass plates. Namely, for the lower pressing die 20b, the portion corresponding to the convex surface portion 24a of the upper pressing die 20a is not formed to have a concave surface which corresponds to the convex surface of the convex surface portion 24a. In pressing operations, the portion of the pressing die 20a which corresponds to the convex surface portion 24a is retracted so that the portion of the glass plates which is pressed by the upper pressing die 20a is not substantially in contact with the lower pressing die 20b. Similarly, for the upper pressing die 20a, the portion which corresponds to the convex surface portion 24b of the lower pressing die 20b is not formed to have a concave surface corresponding to the convex surface of the convex surface portion 24b. Namely, in the pressing operations, the shaping surface corresponding to the convex surface portion 24b of the pressing die 20b is retracted so that the portion of the glass plates which is pushed by the lower pressing die 20b is not substantially in contact with the upper pressing die 20a. In other words, the surface of one of the pressing dies corresponding to the concave surface as a pressing surface of the other pressing die is retracted so that it does not substantially come to contact with the glass plates.

Further, in the above-mentioned pressing dies wherein the pressing portions of the dies respectively have a substantially convex surfaces and the major portion of glass plate is pushed by the convex surfaces, a portion such as the peripheral portion of the glass plate which has little problem of causing a distortion, which makes seeing-through difficult, may be brought into contact with the upper and lower pressing dies in a clamping state during shaping operations. For instance, FIG. 3 shows a construction wherein a glass plate is clamped between the peripheral portion of the upper pressing die 20a and a ring-like deadweight bending mold. In this case, when the width of a ring member is too large, an optical distortion or the like is easily resulted at the peripheral portion. Accordingly, it is desirable that the width of the ring member is about 5 cm or less.

In the above-mentioned embodiment, the pressing surface of the upper and lower pressing dies is formed into a convex shape. However, because of its proximity to the top of the convex surface, it may be more or less recessed depending on the shape of the shaping surface.

Figure 4:
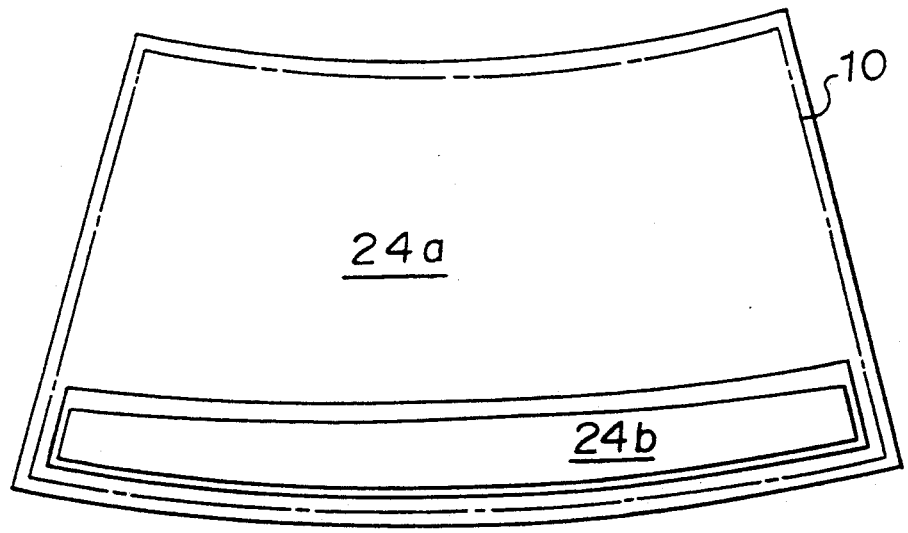
FIG. 4 is a plane view showing a positional relation of a pair of pressing dies to a glass plate in the present invention.

FIG. 4 is a plane view showing a positional relation of a pair of pressing dies to a glass plate. As shown in FIG. 4, the pair of pressing dies have a complementary positional relation when viewed from a pressing direction of the pressing dies.

Although the cylinders 22a, 22b are used as driving means, another driving means such as hydraulic cylinders, electric motors or the like may be used. The driving means is preferably capable of controlling moving distance and moving speed in pressing operations whereby troubles such as the breakage of a glass plate during the shaping operations can be eliminated and precise control of the shape of the glass plate is obtainable.

The function of the bend-shaping press mold of the present invention will be described.

Two glass plates for a laminated glass are put in an overlapping state on the deadweight bending mold 11 as shown in FIGS. 1 and 3. The glass plates on the mold are moved to the pressing stage ST2 by means of the chain 8 along the rails 9 by means of the supporting frame 6 and the metal fitting 7 while the glass plates are heated to a predetermined bend-shaping temperature (preferably about 610° C. for sodalime glass) suitable for bend-shaping in the heating/bend-shaping stage ST1 of the heating furnace 16. During the moving, the glass plates fall downwardly by their deadweight on the deadweight bending mold 11 so that they are provisionally shaped so as to substantially meet the shaping surface of the mold 11.

Then, the provisionally shaped glass plates arrive at the pressing section ST2 having a predetermined working temperature (preferably about 600° C. for sodalime glass).

Figure 5A:
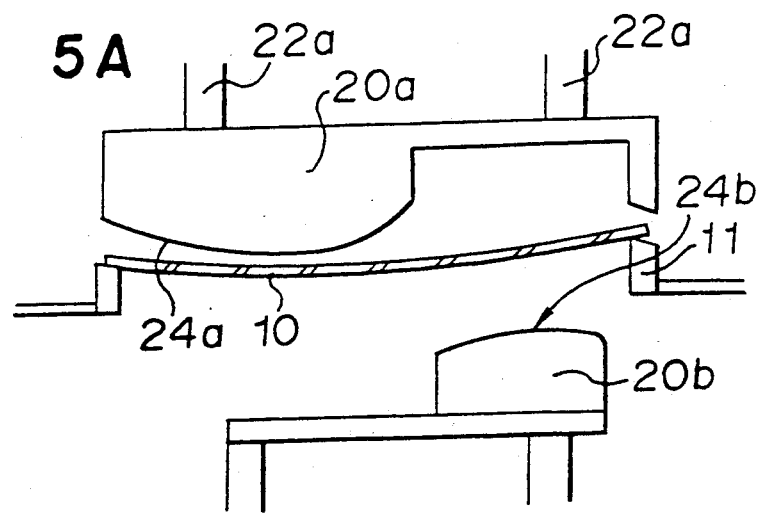
FIGS. 5A through 5C are diagrams showing the operations of the bend-shaping press mold according to the present invention.

FIGS. 5A though 5C are diagrams showing steps of press-shaping of glass plates.

Figure 5B:
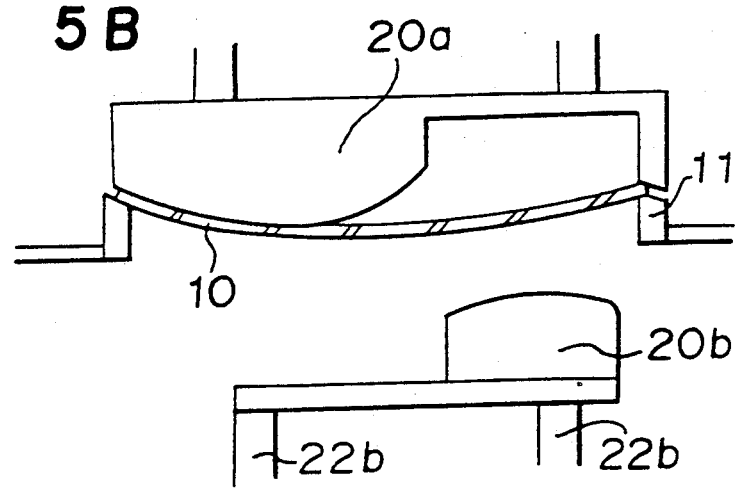
Figure 5C:
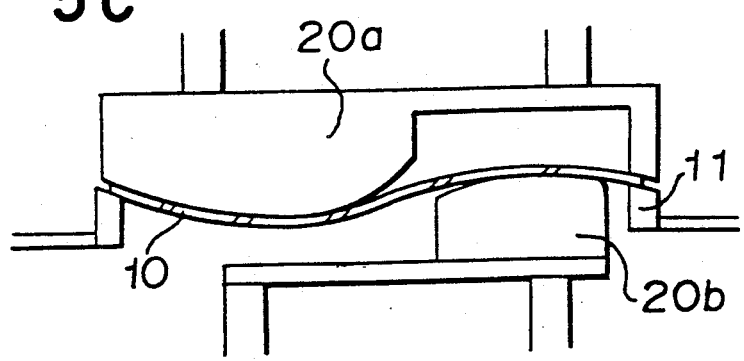

The position of the glass plates on the bending mold is determined with respect to vertically arranged pressing dies (FIG. 5A). The cylinder 22a is operated so that the upper pressing die is descended at a predetermined speed. The upper pressing die 20a is stopped at a position wherein the space between the upper pressing die 20a and the deadweight bending mold 11 equals to the thickness of the glass plates (FIG. 5B). Then, the cylinder 22b is operated to move upwardly the lower pressing die at a predetermined speed. The lower pressing die is stopped at a position wherein the glass plates are bent to have a predetermined shape (FIG. 5C). Then, the cylinders 22a, 22b are operated so that the upper and lower pressing dies 20a, 20b are quickly opened. Then, the glass plates are moved to the cooling section ST3 to be gradually cooled while the glass plates are placed on the deadweight bending mold 11.

In this case, an auxiliary heater or auxiliary heaters may be used in order to locally heat a deeply bent portion at a temperature 10° C. -100° C. higher than that to the other portion so that the deeply bent portion of the glass plates for a laminated glass can be effectively shaped.

When the above mentioned pressing mold is used for press-shaping a laminated glass, a heat insulating cloth such as glass fibers, silica fibers, ceramic fibers, metal fibers is preferably used to cover the contacting surface between the pressing surface and the glass plate in order to avoid the occurrence of a trace on the glass plate.

Further, powder of die lubricant such as sodium bicarbonate, sellaite, magnesium oxide, silica or the like may be applied between the two overlapping glass plates when they are put on the deadweight bending mold.

Further, a heater for heating the peripheral portion of the glass plates may be additionally used to strengthen the peripheral portion, or cooling function to the peripheral portion of the glass plates may be accelerated by raising the glass plates from the deadweight bending mold.

The glass plates for a laminated glass which have been subjected to the bending operations are laminated by a common method applied to form a laminated glass. Namely, the glass plates are laminated by interposing an interlayer such as polyvinyl butyral, and they are press-bonded by the application of heat after a vacuuming operation, or they are press-bonded by pressing and heating after they have been provisionally heated and pressed.

In the above-mentioned embodiment, two glass plates for a laminated glass is bend-shaped. However, the apparatus and the method of the present invention can be naturally applied to the bend-shaping of a single glass plate.

Further, in the above-mentioned embodiment, description has been made as to a case that a laminated glass having an S-like shape in cross section is prepared. However, the present invention can be applied to manufacture a laminated glass or a single glass having more complicated concave and convex surfaces.

Thus, in accordance with the apparatus and the method of the present invention, a bend-shaping press mold comprising a pair of pressing dies for bending a glass plate into a shape having a convex surface and a concave surface in a plane by pressing the glass plate with the pair of pressing dies, wherein each of the pressing dies has at its part a convex surface portion to shape the glass plate by pressing it from each side which is finally shaped to have a concave surface portion, and the convex surface portion of one of the pressing dies is not substantially in contact with the glass plate in pressing operations when the convex surface portion of the other die is in contact with the glass plate, is used. The glass plate is heated and held between the pressing dies and is bend-shaped. Accordingly, one surface of the glass plate is not in contact with shaping surface of one of the dies. Even when accuracy in the shape of the shaping surface of the dies is not sufficiently high or the position arrangement of the upper and lower pressing dies is not complete, an undesirable local stress is not applied to the glass plate, and a local deformation and an optical distortion are avoidable.

In the conventional apparatus and method of bend-shaping a glass plate, extremely accurate dimensions and finishing are required for the shape of the shaping surface of the dies so as not to result in optical distortion. However, in accordance with the apparatus and the method of the present invention, it is sufficient that the bend-shaping press mold has precision of the shape of the shaping surface to the extent as to be required for a glass plate itself (usually about 1 mm).

Further, in accordance with the apparatus and method of the present invention, glass plates having various shapes can be easily obtained by adjusting the position of the lower pressing die.

I claim:

1. A method for bend-shaping a glass plate which comprises:
    placing a glass plate on a deadwieght bending mold having a shaping surface,
    heating the glass plate to a temperature capable of bending glass in a heating furnace to thereby bend it by its deadweight so as to substantially meet the shaping surface of the bending mold, and pressing and bending the glass plate with a bend-shaping press mold comprising a pair of pressing dies for bending a glass plate into a shape having a convex surface and a concave surface on both sides by pressing the glass plate with the pair of pressing dies, wherein each of the pressing dies has a shaping surface comprising a convex surface portion and a retracted surface portion, wherein the convex surface portion of each of the pressing dies shapes the glass plate by pressing the glass plate to finally shape it to have a concave surface portion and the retracted surface portion of each of the pressing dies does not have a concave shape corresponding to the convex surface portion of the other pressing die such that in pressing engagement of the dies, the retracted surface portions do not substantially contact the glass plate.

2. The method of bend-shaping a glass plate according to claim 1, wherein the glass plate is composed of two overlapping glass plates.

3. A method of bend-shaping a glass plate which comprises:

placing a glass plate on a deadweight bending mold having a shaping surface, heating the glass plate to a temperature capable of bending glass in a heating furnace to thereby bend it by its deadweight so as to substantially meet the shaping surface of the bending mold, putting the deadwieght bending mold on which the glass plate is held between a pair of vertically arranged pressing dies for bending a glass plate into a shape having a convex surface and a concave surface on both sides by pressing the glass plate with the pair of pressing dies, wherein each of the pressing dies has a shaping surface comprising convex surface portion and a retracted surface portion, wherein the convex surface portion of each of the pressing dies shapes the glass plate by pressing the glass plate to finally shape it to have a concave surface portion and the retracted surface portion of each of the pressing dies does not have a concave shape corresponding to the convex surface portion of the other pressing die such that in pressing engagement of the dies, the retracted surface portions do not substantially contact the glass plate, pressing the glass plate by the upper one of the pair of pressing dies, and pressing the glass plate by the lower one of the pair of pressing dies while the upper die is in contact with the glass plate.

4. A bend-shaping press mold comprising a pair of pressing dies for bending a glass plate into a shape having a convex surface and a concave surface on both sides by pressing the glass plate with the pair of pressing dies, wherein each of the pressing dies has a shaping surface comprising a convex surface portion and a retracted surface portion, wherein the convex surface portion of each of the pressing dies shapes the glass plate by pressing the glass plate to finally shape it to have a concave surface portion and the retracted surface portion of each of the pressing dies does not have a concave shape corresponding to the convex surface portion of the other pressing die such that in pressing engagement of the dies, the retracted surface portions do not substantially contact the glass plate.

5. An apparatus for bend-shaping a glass plate which comprises:

a heating furnace, a furnace conveyor means, a deadweight bending mold having a shaping surface on which a glass plate is bent by its deadweight, a bend-shaping press mold comprising a pair of pressing dies for bending a glass plate into a shape having a convex surface and a concave surface on both sides by pressing the glass plate with the pair of pressing dies, wherein each of the pressing dies has a shaping surface comprising a convex surface portion and a retracted surface portion, wherein the convex surface portion of each of the pressing dies shapes the glass plate by pressing the glass plate to finally shape it to have a concave surface portion and the retracted surface portion of each of the pressing dies does not have a concave shape corresponding to the convex surface portion of the other pressing die such that in pressing engagement of the dies, the retracted surface portions do not substantially contact the glass plate, wherein the glass plate deadweight bending mold passes between the pair of pressing dies in the bend-shaping press mold, and driving means attached to the pressing dies for vertically driving the pressing dies, wherein the deadweight bending mold is moved in the heating furnace by the furnace conveyor means.

* * * * *